(12) United States Patent
Marsh et al.

(10) Patent No.: US 7,886,863 B2
(45) Date of Patent: Feb. 15, 2011

(54) DRIVESHAFT ASSEMBLY WITH TORQUE SENSOR

(75) Inventors: Gregory A Marsh, Ferndale, MI (US); Glen C Steyer, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 172 days.

(21) Appl. No.: 12/369,998

(22) Filed: Feb. 12, 2009

(65) Prior Publication Data

US 2010/0200325 A1 Aug. 12, 2010

(51) Int. Cl.
*B60K 17/22* (2006.01)
*G01L 5/00* (2006.01)

(52) U.S. Cl. .................. 180/383; 180/376; 73/862.325; 73/115.05

(58) Field of Classification Search . 73/115.01–115.08, 73/862.325; 180/376, 383–385; 340/665; 464/162, 23, 178; 701/51, 57
See application file for complete search history.

(56) References Cited

U.S. PATENT DOCUMENTS

| 3,170,323 | A | * | 2/1965 | Hans-Joachim et al. | 73/862.326 |
|---|---|---|---|---|---|
| 3,194,065 | A | * | 7/1965 | Wilson | 73/862.327 |
| 3,545,265 | A | * | 12/1970 | Kingsford-Smith et al. | 73/862.326 |
| 4,364,278 | A | * | 12/1982 | Horter et al. | 73/862.335 |
| 4,392,694 | A | | 7/1983 | Reynolds | |
| 4,503,713 | A | | 3/1985 | Obayashi et al. | |
| 4,513,626 | A | | 4/1985 | Obayashi et al. | |
| 4,627,298 | A | * | 12/1986 | Sahashi et al. | 73/862.336 |
| 4,711,134 | A | * | 12/1987 | Kita | 73/862.333 |
| 4,760,745 | A | * | 8/1988 | Garshelis | 73/862.333 |
| 4,803,885 | A | * | 2/1989 | Nonomura et al. | 73/862.333 |
| 4,805,466 | A | * | 2/1989 | Schiessle et al. | 73/862.336 |
| 4,885,944 | A | | 12/1989 | Yagi et al. | |
| 4,899,598 | A | * | 2/1990 | Gumaste et al. | 73/862.335 |
| 4,962,672 | A | * | 10/1990 | Yagi et al. | 73/862.335 |
| RE34,039 | E | * | 8/1992 | Kobayashi et al. | 73/862.336 |

(Continued)

FOREIGN PATENT DOCUMENTS

DE 296 14 974 11/1996

(Continued)

OTHER PUBLICATIONS

NCTE, Torque Sensor Design and Dimension Dated: Feb. 2005.

*Primary Examiner*—Paul N Dickson
*Assistant Examiner*—Laura Freedman
(74) *Attorney, Agent, or Firm*—Harness, Dickey & Pierce, P.L.C.

(57) ABSTRACT

A driveshaft assembly that includes a first shaft member, a second shaft member, a bearing assembly and a sensor. The first shaft member has a magnetically encoded zone with a magnetic field that varies as a function of the torque that is transmitted through the first shaft member. The second shaft member is coupled for rotation with the first shaft member. The bearing assembly comprises a bearing support, which is configured to be coupled to a vehicle structure, and a bearing that is housed in the bearing support. The bearing journally supports the first shaft member for rotation about a first axis. The sensor is coupled to the bearing assembly. The sensor is arranged to sense the magnetic field of the magnetically encoded zone and responsively produce an electrical signal.

12 Claims, 4 Drawing Sheets

U.S. PATENT DOCUMENTS

| | | | |
|---|---|---|---|
| 5,186,059 A * | 2/1993 | Ishino et al. ............ | 73/862.193 |
| 5,255,567 A * | 10/1993 | Miyake et al. ......... | 73/862.333 |
| 5,285,691 A | 2/1994 | Baer | |
| 5,323,659 A * | 6/1994 | Wakamiya et al. ....... | 73/862.28 |
| 5,351,555 A * | 10/1994 | Garshelis ............... | 73/862.335 |
| 5,353,649 A * | 10/1994 | Hase et al. ............. | 73/862.335 |
| 5,456,123 A | 10/1995 | Parkinson | |
| 5,585,574 A * | 12/1996 | Sugihara et al. ........ | 73/862.334 |
| 5,887,335 A | 3/1999 | Garshells | |
| 6,135,571 A * | 10/2000 | Mizukoshi et al. ....... | 301/105.1 |
| 6,289,748 B1 | 9/2001 | Lin et al. | |
| 6,352,649 B1 * | 3/2002 | McCallum et al. ....... | 252/62.55 |
| 6,467,360 B1 * | 10/2002 | Bogdanov ............. | 73/862.333 |
| 6,487,925 B2 | 12/2002 | Fischer et al. | |
| 6,581,480 B1 | 6/2003 | May et al. | |
| 6,776,057 B1 * | 8/2004 | May ..................... | 73/862.333 |
| 6,883,967 B2 * | 4/2005 | Robb et al. ................. | 384/536 |
| 6,910,391 B1 * | 6/2005 | May ..................... | 73/862.333 |
| 6,960,024 B2 * | 11/2005 | Robb et al. ................. | 384/536 |
| 7,024,946 B2 * | 4/2006 | Nehl et al. ............. | 73/862.333 |
| 7,140,258 B2 * | 11/2006 | May ........................... | 73/779 |
| 7,174,795 B2 | 2/2007 | Feng et al. | |
| 7,211,020 B2 * | 5/2007 | Gohl et al .................... | 475/231 |
| 7,219,564 B1 * | 5/2007 | May ..................... | 73/862.333 |
| 7,263,904 B2 * | 9/2007 | Yoshida et al. ......... | 73/862.331 |
| 7,293,476 B2 * | 11/2007 | Gierut ................... | 73/862.335 |
| 7,401,531 B2 * | 7/2008 | Cripe .................... | 73/862.333 |
| 2004/0025600 A1 | 2/2004 | Viola et al. | |
| 2007/0018837 A1 | 1/2007 | Mizutani et al. | |
| 2007/0247224 A1 | 10/2007 | May | |
| 2009/0007697 A1 | 1/2009 | May | |

FOREIGN PATENT DOCUMENTS

| | | |
|---|---|---|
| JP | 08-271355 | 10/1996 |
| WO | 00/57150 | 9/2000 |
| WO | 01/13081 | 2/2001 |
| WO | 01/20342 | 3/2001 |

* cited by examiner

DRIVESHAFT ASSEMBLY WITH TORQUE SENSOR

FIELD

The present invention generally relates to a driveshaft assembly with a torque sensor.

BACKGROUND

This section provides background information related to the present disclosure which is not necessarily prior art.

Motorized vehicles traditionally include a power supply (e.g. an internal combustion engine, an electric motor and/or a combination thereof) that produces a drive torque. A transmission receives the drive torque and employs various gear ratios to modify the input torque to obtain various desired output torques. The output torque is then transmitted through a driveshaft to a differential unit, which evenly distributes the torque between a pair of axle shafts. The axle shafts, in turn, cause movement of the vehicle wheels.

The torque measurement may be obtained through use of a torque sensor, such as a strain gage or a surface acoustic wave device (SAW), which can monitor shaft torque while the driveshaft is in a rotating or dynamic state. This information is then relayed to other vehicle systems and to the operator for further analysis and action. Such sensors are relatively expensive and, as such, it is common to employ various techniques to approximate the magnitude of the torque transmitted through the driveshaft rather than to directly measure the magnitude of the torque.

It would, therefore, be desirable to provide a driveshaft assembly with a torque sensor that was more economical in cost.

SUMMARY

This section provides a general summary of some aspects of the present disclosure and is not a comprehensive listing or detailing of either the full scope of the disclosure or all of the features described therein.

In one form, the present teachings provide a driveshaft assembly that includes a first shaft member, a second shaft member, a bearing assembly and a sensor. The first shaft member has a magnetically encoded zone with a magnetic field that varies as a function of the torque that is transmitted through the first shaft member. The second shaft member is coupled for rotation with the first shaft member. The bearing assembly comprises a bearing support, which is configured to be coupled to a vehicle structure, and a bearing that is housed in the bearing support. The bearing journally supports the first shaft member for rotation about a first axis. The sensor is coupled to the bearing assembly. The sensor is arranged to sense the magnetic field of the magnetically encoded zone and responsively produce an electrical signal.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
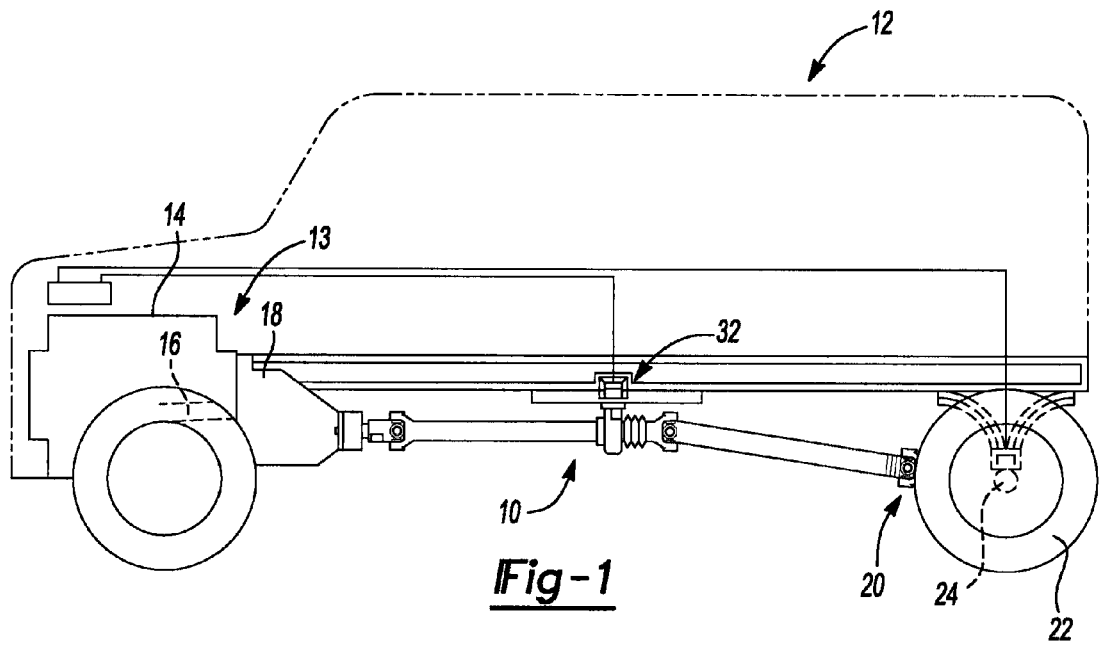
FIG. 1 is a perspective view of a motor vehicle illustrating a driveshaft assembly constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1 of the drawings, a driveshaft assembly constructed in accordance with the teachings of the present invention is generally indicated by reference numeral 10. In a rear-wheel drive motor vehicle 12, a powertrain 13 coupled to the vehicle 12 includes a longitudinally-mounted engine 14 rotatably driving a crankshaft 16 for providing rotary power to a transmission 18. The powertrain 13 outputs the rotary power to a rear axle assembly 20, also coupled to the vehicle 12, via the driveshaft assembly 10 for powering the vehicle 12. The rear axle assembly 20 distributes the rotary power to a pair of vehicle wheels 22 via axle shafts 24. It should be noted that while the rear-wheel drive vehicle 12 is illustrated, the present disclosure will also apply to other vehicle arrangements, such as, for example, all-wheel drive vehicles.

Figure 2:
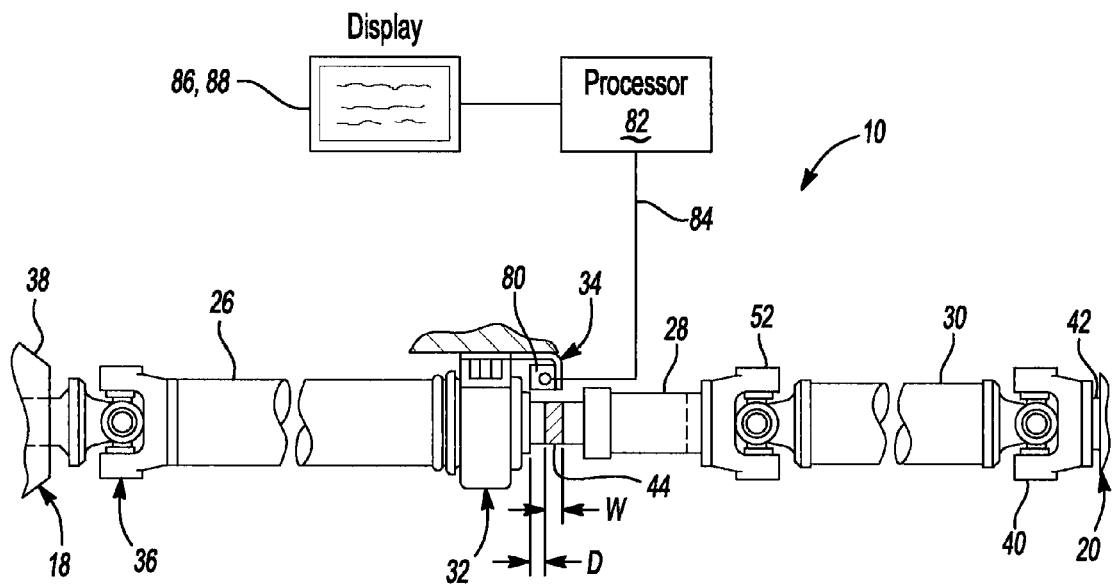
FIG. 2 is a side elevation view of the driveshaft assembly of FIG. 1.
Figure 3:
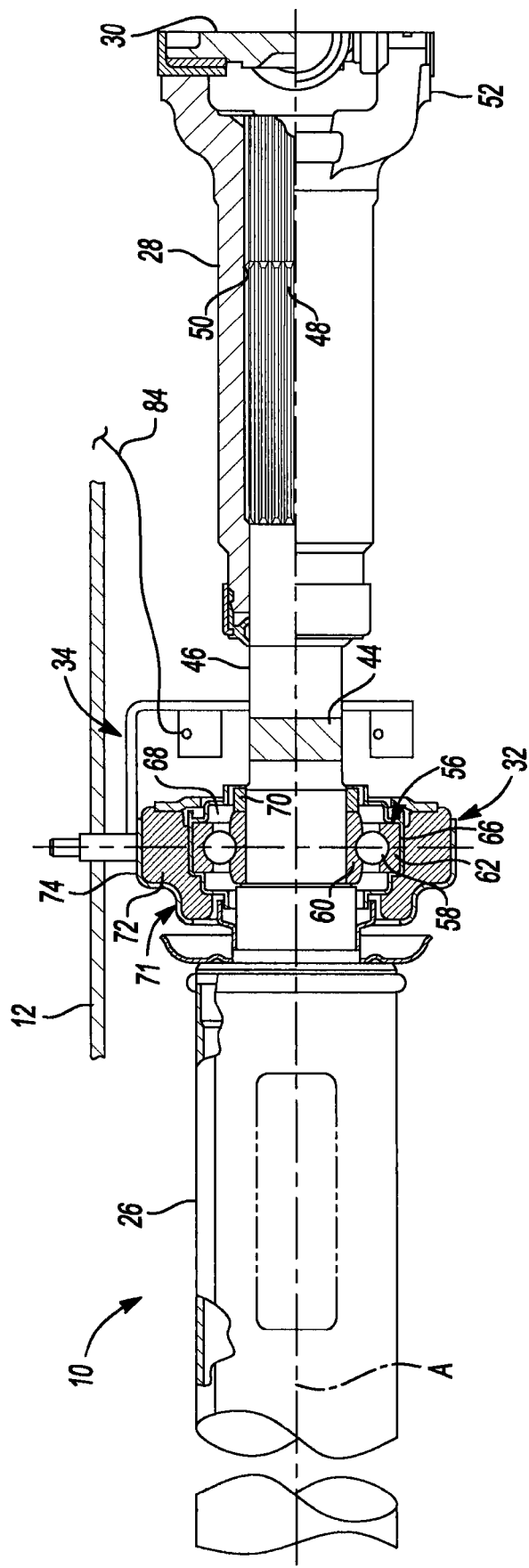
FIG. 3 is a cross-sectional view of a portion of the driveshaft assembly of FIG. 1.

Referring to FIGS. 2 and 3, the driveshaft assembly 10 may include a shaft member 26, a slip yoke 28, a coupling shaft 30, a bearing assembly 32, a sensor assembly 34, a first universal joint 36 that can couple the driveshaft assembly 10 to an output shaft 38 of the transmission 18, and a second universal joint 40 that can couple the driveshaft assembly 10 to an input pinion 42 associated with the rear axle assembly 20. At least a portion of the shaft member 26 can be formed of a nickel-alloy steel consisting of 2% by weight to 6% by weight nickel, as described in U.S. Application No. 2009/0007697. For example, suitable steel materials include 50NiCr13, X4CrNi13-4, X5CrNiCuNb16-4, X20CrNi17-4, X46Cr13, X20Cr13, 14NiCr14, and S155 as described in U.S. Application No. 2007/0247224. Both U.S. Application No. 2009/0007697 and U.S. Application No. 2007/0247224 are incorporated herein by reference, limited to discussion on selection of material for a magnetically encoded region.

The high nickel-alloy content material allows the shaft member 26 to be magnetically encoded within a prescribed region or encoded zone 44. The magnetically encoded zone 44 of the shaft member 26 may have a magnetic field that varies as a function of the speed of rotation and torque that is transmitted through the shaft member 26.

The encoded zone 44 can be formed on a surface 46 of the shaft member 26 and can be spaced by a minimum distance, D, from any feature that may interfere with the magnetic field produced in the encoded zone 44. For example, the proximity of the bearing assembly 32 and diameter changes within the shaft member 26 may negatively impact the magnetic field. It should be noted that the minimum distance, D, must be large enough to accommodate all magnetic field fluctuations. The width, W, of the encoded zone 44 may vary with diameter of the shaft member 26. For example, with the shaft member 26 having a diameter of 30.48 mm the width of the encoded zone 44 may be about 60 mm.

While the disclosure of the present application is directed to the driveshaft assembly 10, it should be understood that other packaging solutions for the present disclosure exist. For example, while the encoded zone 44 is illustrated as being disposed between the bearing assembly 32 and the slip yoke 28, the encoded zone 44 may alternatively be located on the slip yoke 28, the coupling shaft 30, and/or the axle shafts 24. In any of the aforementioned applications, a material change to a high nickel-alloy content material will still be required to achieve the magnetic field in the encoded zone 44.

The shaft member 26 may either be directly connected to the rear axle assembly 20 (e.g. one-piece propeller shaft construction) or may be indirectly connected through any means known in the art. For example, in a multi-piece shaft member construction, the shaft member 26 may include a male-splined end portion 48 opposite the first universal joint 36 coupled for rotation with a female-splined end portion 50 on the slip yoke 28. The slip yoke 28 may behave as an expansion joint allowing for vertical and longitudinal movement in the vehicle's suspension system. A second end 52 of the slip yoke 28 opposite the female splined end portion 50 may be coupled for rotation with the coupling shaft 30. In operation, the coupling shaft 30 may transmit the rotary power received by the driveshaft assembly 10 to the rear axle assembly 20.

It should be understood that in certain vehicle configurations, the slip yoke 28 and/or coupling shaft 30 may be omitted and the second universal joint 40 may be located at the end portion 48 of the shaft member 26. Additionally, while the slip yoke 28 is illustrated as including the female-splined end portion 50 matingly received by the male-splined end portion 48 of the shaft member 26, the male/female splining may be interchanged between the slip yoke 28 and the shaft member 26.

The bearing assembly 32 can mount the driveshaft assembly 10 to the vehicle 12 (FIG. 1). The bearing assembly 32 can be configured in a manner that is substantially as described in U.S. Pat. No. 4,392,694, incorporated herein by reference. Briefly, the bearing assembly 32 can support the driveshaft assembly 10 for rotation about a central axis, A, and may include a conventional retainer bearing 56 having a plurality of bearing balls 58 disposed between an inner, rotatable race 60 and an outer, non-rotatable race 62. The inner race 60 can engage a portion of the shaft member 26. An annular dirt shield 66 can surround the outer race 62, define an interior space 68 containing lubrication for the bearing balls 58, and prevent contaminants from entering the interior space 68. The retainer bearing 56 may be maintained in position through the use of a retainer flange 70. The retainer flange 70, as shown, may be included within the annular dirt shield 66 or may be located adjacent the annular dirt shield 66.

A mount 71 is employed to resiliently mount the retainer bearing 56 to the vehicle 12. The mount 71 can include a resilient rubber member or bushing 72 disposed between a bearing support 74 and the retainer bearing 56. The resilient bushing 72 may be molded directly onto the bearing support 74 and the retainer bearing 56 so as to be permanently bonded thereto.

Figure 4:
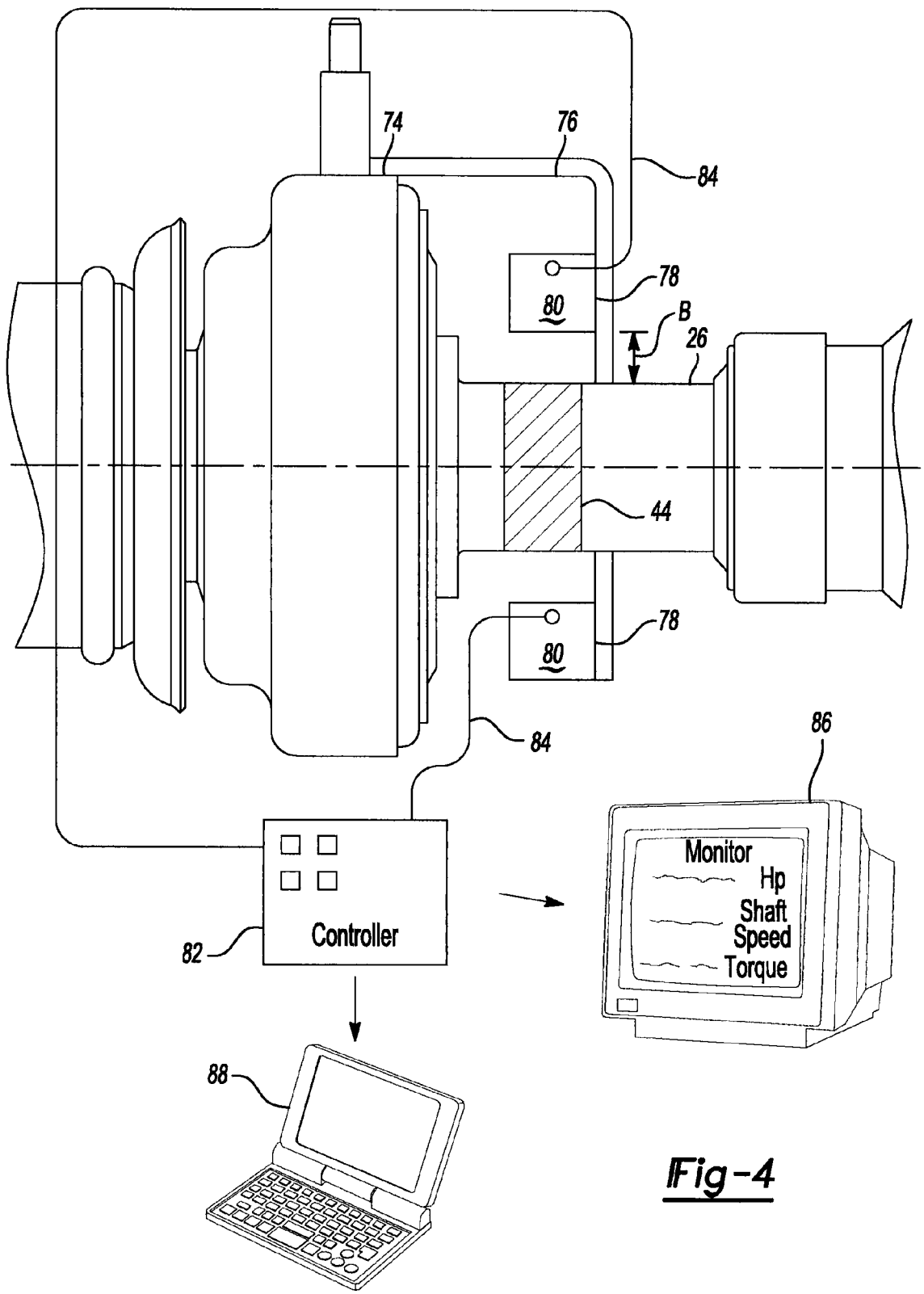
FIG. 4 is an enlarged view of a portion of FIG. 2.

In FIG. 4, a bracket 76 can be fixedly attached to the bearing support 74 and may be shaped so as to place a sensor array 78 comprising a plurality of sensors 80 at a predetermined, radially outward distance, B, from the encoded zone 44. While the mounting bracket 76 is described as being a separate member, it is also contemplated that the mounting bracket 76 and the bearing support 74 may be unitarily formed in the desired shape for locating the plurality of sensors 80. Additionally, the radially outward distance, B, of the plurality of sensors 80 may be selected based on the functionality and quantity of sensors 80 chosen for the application. For example, the radially outward distance, B, may be less than 6 mm for the shaft member 26 having three (3) sensors 80.

The plurality of sensors 80 are configured to sense the magnetic field of the encoded zone 44 and responsively produce an electrical signal corresponding to the change in the magnetic field for a given speed of the shaft member 26. The electrical signal generated by each of the sensors 80 can be received by a central processor or controller 82 through associated signal wires 84. In turn, the controller 82 may utilize the signals to calculate vehicle horsepower and torque, which can be relayed to the vehicle operator through known methods, such as, for example, an attached monitor 86 or a removable data computer 88 (e.g. a laptop). This calculation allows performance data to be obtained and/or monitored directly on the vehicle 12, rather than estimated. Advantageously, the controller 82 may also use the calculated values to provide better control over shift points, modulation of engine control, and early warning diagnostics based on driveline vibration issues too slight to be detectable by the vehicle operator.

Figure 5:
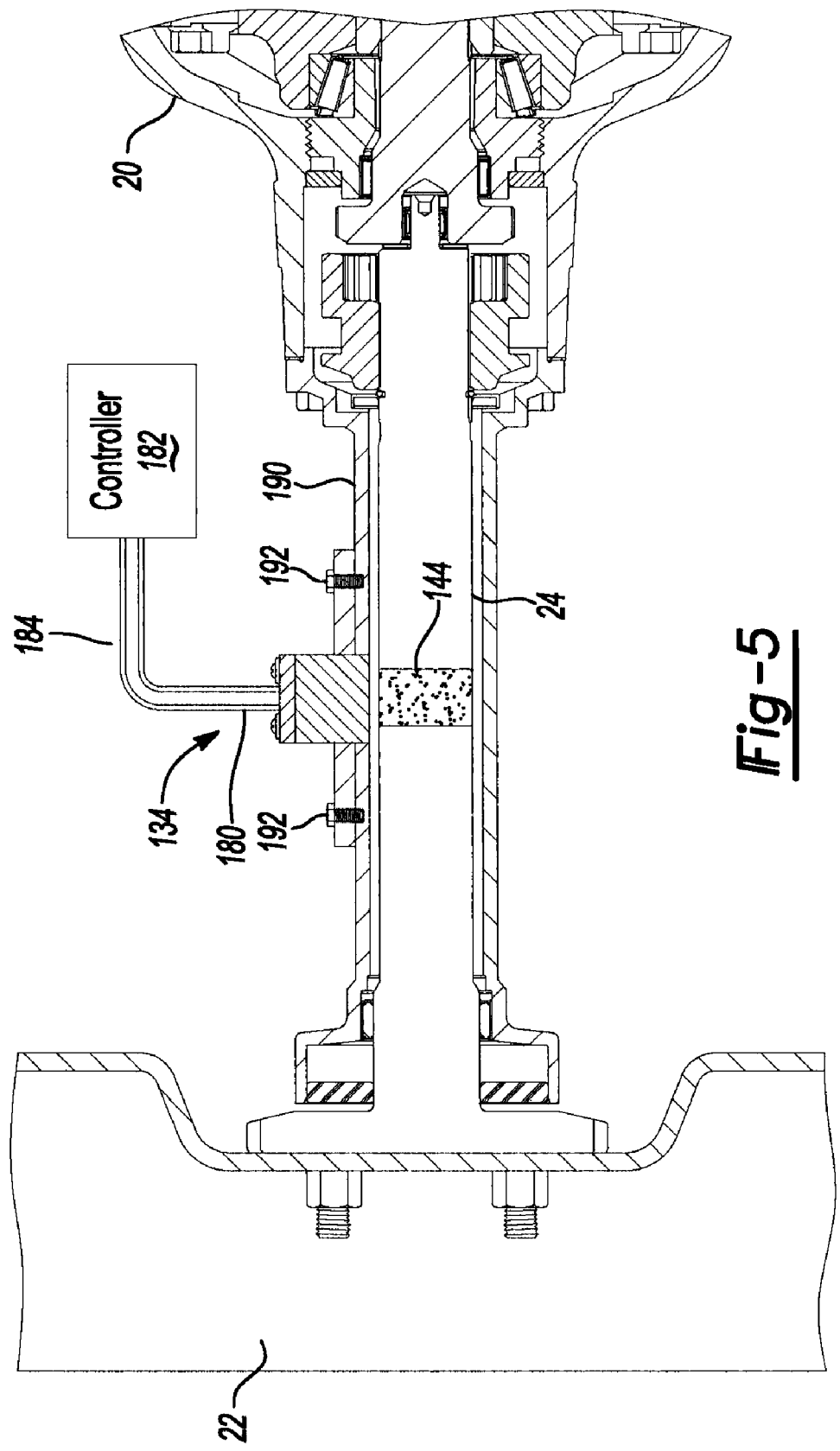
FIG. 5 is a side view illustrating another driveshaft assembly constructed in accordance with the teachings of the present disclosure.

While the aforementioned sensor assembly 34 utilizes signals from multiple sensors 80 in the torque calculation, torque may also be calculated through the use of a single-point sensor 180 (as shown in FIG. 5). In the single-point sensor 180 application, a full revolution of the shaft member 26 is necessary to obtain an accurate torque calculation. However, a torque spike that occurs at a near stall condition (e.g. low revolution per minute (RPM) of the shaft member 26) and persists through only a portion of the shaft member 26 rotation (e.g. 30 degrees of shaft rotation), may not be detected by the single-point sensor 180. Therefore, more accurate results are typically obtained by utilizing the plurality of sensors 80 (e.g. at least three sensors). In tightly constrained areas such as at the axle shafts 24, the single-point sensor 180 may be the only option. In such an application, the negative aspect of a "single pick-up point" is negligible if the shaft speed remains relatively high (e.g. on the order of 250 RPM or greater).

In a second embodiment of the present disclosure, as depicted in FIG. 5, a sensor assembly 134 includes the single-point sensor 180 illustrated as a drop-in style sensor on an axle tube 190 that can be associated with the rear axle assembly 20 (FIG. 1) and can be configured to house the axle shaft 24. The sensor assembly 134 may be fixedly attached to the axle tube 190 through any means known in the art, such as, for example through a pair of fasteners 192.

The single-point sensor 180 operates similarly to the plurality of sensors 80 (FIG. 4) by sensing change in a magnetic field generated by an encoded zone 144 formed on the axle shaft 24 as the axle shaft 24 rotates inside of the axle tube 190. As with the encoded zone 44 (FIG. 2), the encoded zone 144 can be manufactured from a relatively high nickel-alloy content material to allow the axle shaft 24 to be magnetically encoded within the prescribed region or encoded zone 144. Similarly to the magnetic field generated by the shaft member 26 (FIG. 2), the magnetic field of the axle shaft 24 varies as a function of the torque that is transmitted through the axle shaft 24.

The single-point sensor 180 can then provide an electrical signal, corresponding to the change in the magnetic field, to a central processor or controller 182 through signal wires 184. The controller 182 may utilize the values to calculate vehicle horsepower and torque, which can be relayed to the vehicle operator through known methods, such as those previously described.

Certain advantages can be realized through use of the single-point sensor 180 at the axle shaft 24. For example, more detailed information may be gathered with respect to the torque caused by each vehicle wheel 22, as opposed to obtaining an average torque through the shaft member 26 (FIG. 1). Additionally, since the axle shafts 24 are closer to the source of the torque (e.g. the road surface), less time is lost before a reaction from the vehicle 12. This allows for a feedback loop for the vehicle's braking and stability control system.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A driveshaft assembly for transmitting rotary power between a first driveline component and a second driveline component, the driveshaft assembly comprising:
   a first universal joint having a splined member that is adapted to be non-rotatably but axially slidably coupled to an output member of the first driveline component to receive rotary power therefrom;
   a first shaft member having a first end, a second end and a magnetically encoded zone, the first end of the first shaft being mounted to the first universal joint to receive rotary power therefrom, the magnetically encoded zone being configured to produce a magnetic field that varies as a function of a torque that is transmitted through the first shaft member;
   a second shaft member;
   a second universal joint coupling a first end of the second shaft member to the second end of the first shaft member for rotation therewith;
   a third universal joint coupled to a second end of the second shaft member, the third universal joint being configured to couple the second shaft member to an input member of the second driveline component;
   a bearing assembly that comprises a bearing support, which is adapted to be coupled to a vehicle structure, and a bearing that is housed in the bearing support and journally supports the second end of the first shaft member for rotation about a first axis; and
   a sensor coupled to the bearing assembly and arranged to sense the magnetic field of the magnetically encoded zone and responsively produce an electrical signal.

2. The driveshaft assembly of claim 1, wherein the bearing comprises an outer race, an inner race and a plurality of bearing elements disposed between the inner and outer races, wherein the bearing support is disposed radially outwardly of and circumferentially about the outer bearing race and wherein the bearing assembly further comprises a resilient mount that is disposed radially between the bearing support and the bearing.

3. The driveshaft assembly of claim 1, further comprising a processor and a display, the processor receiving the electrical signal and being configured to cause the display to display a value that is indicative of a magnitude of a torque that is transmitted through the first shaft member.

4. The driveshaft assembly of claim 1, wherein the magnetically encoded zone is disposed between the bearing assembly and the first universal joint.

5. The driveshaft assembly of claim 1, wherein the magnetically encoded zone is formed of a material that consists of 2 percent by weight to 6 percent by weight nickel.

6. A vehicle comprising:
   a powertrain having a powertrain output;
   an axle assembly having an input pinion;
   a body to which the powertrain and axle assembly are coupled;
   a driveshaft assembly coupling the powertrain output and the input pinion to transmit rotary power to the input pinion, the driveshaft assembly comprising a first shaft member, a second shaft member, a bearing assembly and a plurality of sensors, the first shaft member having a magnetically encoded zone with a magnetic field that varies as a function of a torque that is transmitted through the first shaft member, the second shaft member being coupled for rotation with the first shaft member, the bearing assembly having a bearing support, which is coupled to the body, and a bearing that is housed in the bearing support and journally supports the first shaft member for rotation about a first axis, each of the sensors being coupled to the bearing assembly, wherein the sensors are spaced apart around the driveshaft assembly to sense a portion of the magnetic field of the magnetically encoded zone and responsively produce a corresponding electrical signal.

7. The driveshaft assembly of claim 6, wherein the bearing assembly comprises a resilient mount that is disposed between the bearing support and the bearing.

8. The driveshaft assembly of claim 6, further comprising a processor and a display, the processor receiving the electrical signal and being configured to cause the display to display a value that is indicative of a magnitude of a torque that is transmitted through the first shaft member.

9. The driveshaft assembly of claim 6, further comprising a slip yoke coupled to the first shaft member.

10. The driveshaft assembly of claim 9, wherein the magnetically encoded zone is disposed between the bearing assembly and the slip yoke.

11. The driveshaft assembly of claim 10, wherein one of the first shaft member and the slip yoke includes a male splined end and the other one of the first shaft member and the slip yoke includes a female splined end that is engaged to the male splined end.

12. The driveshaft assembly of claim 6, wherein the magnetically encoded zone is formed of a material that consists of 2 percent by weight to 6 percent by weight nickel.

* * * * *